(12) United States Patent
Everson et al.

(10) Patent No.: US 8,204,637 B1
(45) Date of Patent: Jun. 19, 2012

(54) AIRCRAFT APPROACH TO LANDING ANALYSIS METHOD

(75) Inventors: Daniel P. Everson, Bethesda, MD (US); Phong H. Nguyen, Reston, VA (US); Eric J. Silberg, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 571 days.

(21) Appl. No.: 12/497,875

(22) Filed: Jul. 6, 2009

Related U.S. Application Data

(63) Continuation-in-part of application No. 12/006,753, filed on Dec. 20, 2007, now Pat. No. 8,094,154, and a continuation-in-part of application No. 12/006,754, filed on Dec. 20, 2007, now Pat. No. 7,797,130.

(51) Int. Cl.
*G06F 17/18* (2006.01)
*G06T 7/20* (2006.01)

(52) U.S. Cl. ......... 701/15; 701/14; 345/440; 345/440.2; 702/179; 702/187; 700/108; 705/17.29; 705/7.31

(58) Field of Classification Search ..................... 701/16
See application file for complete search history.

(56) References Cited

U.S. PATENT DOCUMENTS

| | | | |
|---|---|---|---|
| 5,175,710 A | 12/1992 | Hutson | |
| 5,347,452 A | 9/1994 | Bay, Jr. | |
| 5,819,202 A | 10/1998 | Sato et al. | |
| 6,453,009 B2 | 9/2002 | Berezowitz et al. | |
| 6,473,084 B1 | 10/2002 | Phillips et al. | |
| 6,606,615 B1 | 8/2003 | Jennings et al. | |
| 6,629,060 B2 | 9/2003 | Okuno et al. | |
| 6,704,012 B1 * | 3/2004 | Lefave | 345/440 |
| 6,750,864 B1 | 6/2004 | Anwar | |
| 6,772,096 B2 | 8/2004 | Murakami et al. | |
| 6,792,399 B1 | 9/2004 | Phillips et al. | |
| 6,834,256 B2 | 12/2004 | House et al. | |
| 6,842,719 B1 | 1/2005 | Fitzpatrick et al. | |
| 6,900,808 B2 * | 5/2005 | Lassiter et al. | 345/440 |
| 6,972,761 B1 | 12/2005 | Cox et al. | |
| 7,000,193 B1 | 2/2006 | Impink, Jr. et al. | |
| 7,065,534 B2 | 6/2006 | Folting et al. | |
| 7,072,863 B1 | 7/2006 | Phillips et al. | |
| 7,080,027 B2 | 7/2006 | Luby et al. | |

(Continued)

OTHER PUBLICATIONS

Leading Indicators—A Powerful Tool to Improve Rotocraft Safety, Eric J. Silberg et al., International Helicopter Safety Symposium, Montreal, Canada, Sep. 19-21, 2007.

(Continued)

*Primary Examiner* — Thomas G. Black
*Assistant Examiner* — Lin B Olsen
(74) *Attorney, Agent, or Firm* — Richard A. Morgan

(57) ABSTRACT

A method has been found for assessing an aircraft approach to landing on a shipboard landing surface. The method includes a comparison of an identified aircraft performance with the mean or median of a baseline data set. The baseline data set is assembled from a multiplicity of actual approaches to landing data that are selected for relevance and then statistically evaluated. A high data recording rate captures the pilot's control inputs and allows evaluation of the pilot's manual efficiency of input to controls. The method is particularly useful to evaluate performance under conditions in which evaluation by human observation is limited or evaluation against guidelines produces less meaningful results.

18 Claims, 4 Drawing Sheets

U.S. PATENT DOCUMENTS

| | | | |
|---|---|---|---|
| 7,124,438 | B2 | 10/2006 | Judge et al. |
| 7,162,489 | B2 | 1/2007 | Folting et al. |
| 7,254,514 | B2 | 8/2007 | House et al. |
| 7,593,912 | B2 | 9/2009 | Cheng et al. |
| 7,624,080 | B1 | 11/2009 | Morales et al. |
| 7,714,536 | B1 | 5/2010 | Silberg et al. |
| 7,797,130 | B1 * | 9/2010 | Silberg et al. ............ 702/179 |
| 8,094,154 | B1 * | 1/2012 | Silberg et al. ............ 345/440 |
| 2004/0260430 | A1 | 12/2004 | Mansingh et al. |
| 2004/0260489 | A1 | 12/2004 | Mansingh et al. |
| 2007/0220368 | A1 * | 9/2007 | Jaw et al. ............ 714/48 |
| 2007/0282767 | A1 | 12/2007 | Cheng et al. |
| 2007/0299362 | A1 | 12/2007 | Epley et al. |
| 2008/0147486 | A1 * | 6/2008 | Wu ............ 705/10 |
| 2008/0208532 | A1 | 8/2008 | Blemel |
| 2009/0125168 | A1 * | 5/2009 | Voisin ............ 701/15 |
| 2009/0156846 | A1 * | 6/2009 | Seki et al. ............ 554/170 |
| 2009/0249129 | A1 | 10/2009 | Femia |
| 2009/0256846 | A1 | 10/2009 | Zahariev |

OTHER PUBLICATIONS

Advanced Aircraft Landing Analysis and Assessment Methods for Naval Aircraft, Eric J. Silberg et al., American Institute of Aeronautics and Astronautics Modeling and Simulation Technologies Conference, Honolulu, Hawaii, Aug. 18-21, 2008.

(Copending) U.S. Appl. No. 12/006,754, filed Dec. 20, 2007, entitled "Baseline Comparative Leading Indicator Analysis," joint inventors Eric J. Silberg, Phong Hua Nguyen, Daniel P. Everson, and Naipei P. Bi, now U.S. Patent No. 7,797,130 B1, issue date Sep. 14, 2010.

(Copending) U.S. Appl. No. 12/006,753, filed Dec. 20, 2007, entitled "Intelligent Leading Indicator Display," joint inventors Eric J. Silberg, Phong Hua Nguyen, Daniel P. Everson, and Naipei P. Bi, now U.S. Patent No. 8,094,154 B1, issue date Jan. 10, 2012.

Eric J. Silberg, "Determination and Utilization of Leading Indicators for Improved Aircraft Operations," technical paper submitted by student Eric J. Silberg to two University of Maryland faculty members on Dec. 22, 2006 to fulfill a masters program requirement in the Department of Aerospace Engineering of the University of Maryland, College Park (32 pages).

* cited by examiner

FIG. 2
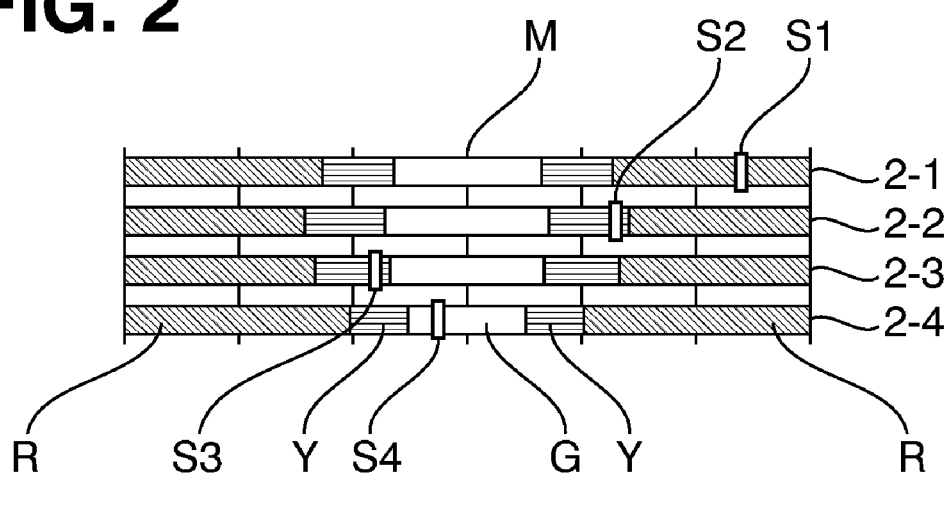
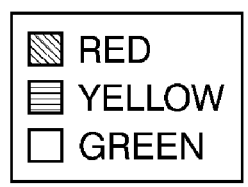

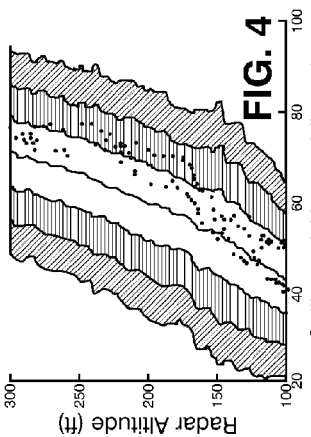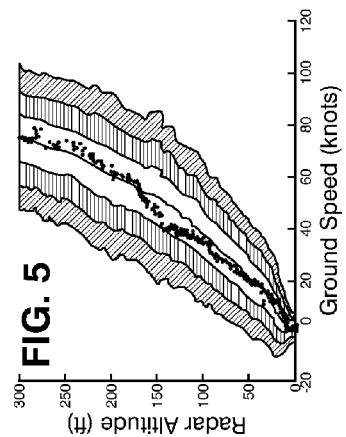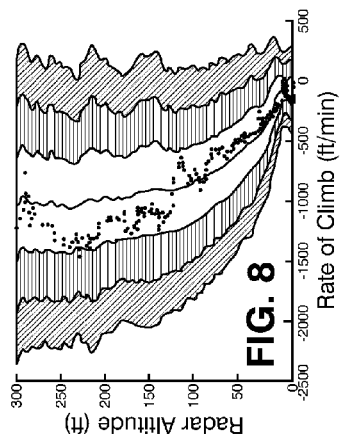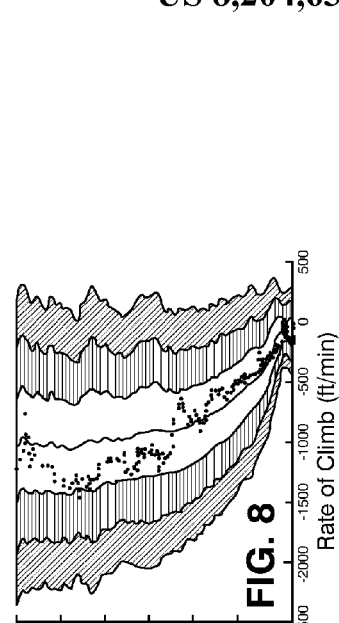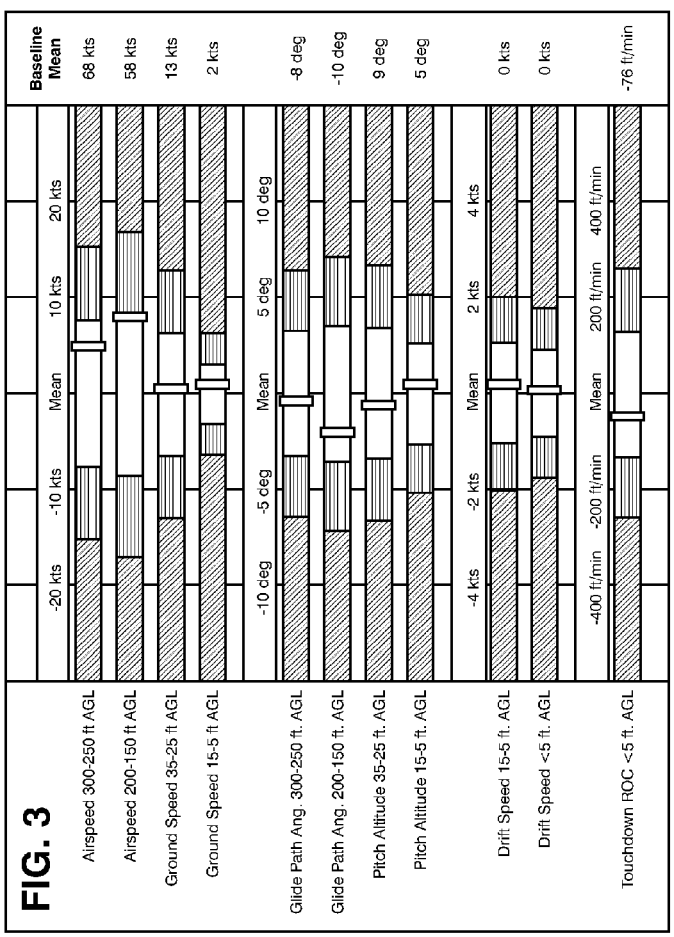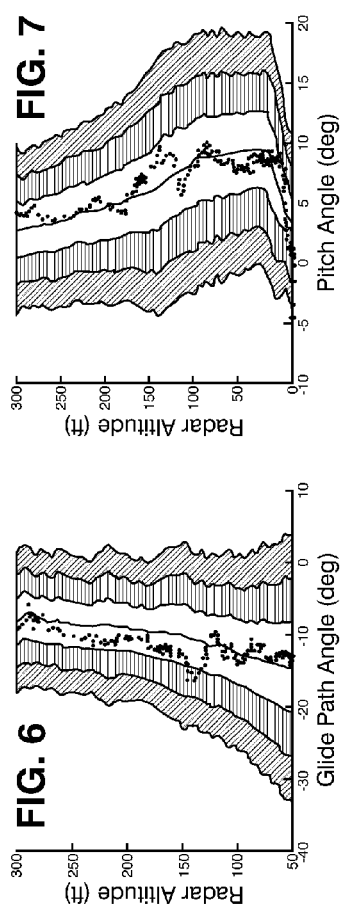

AIRCRAFT APPROACH TO LANDING ANALYSIS METHOD

CROSS-REFERENCE TO RELATED APPLICATION

This application is a continuation-in-part of U.S. patent application Ser. No. 12/006,753 filed Dec. 20, 2007, for Intelligent Leading Indicator Display to Eric J. Silberg, Phong Hua Nguyen, Daniel P. Everson and Naipei P. Bi, incorporated herein by reference. This application is also a continuation-in-part of U.S. patent application Ser. No. 12/006,754 filed Dec. 20, 2007, for Baseline Comparative Leading Indicator Analysis to Eric J. Silberg, incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to data processing involving vehicles, navigation and relative location. More particularly the invention relates to indication of aircraft performance. Most particularly the invention relates to indication of aircraft approach and landing.

2. Discussion of the Related Art

Landing aircraft under challenging weather conditions and landing locations requires high pilot proficiency. This is particularly so for environments in which the sea contributes to landing conditions and runway size is limited such as on shipboard decks and stationary offshore platform pads. To ensure the required pilot proficiency is attained and maintained, experienced and specially trained personnel observe, assess and critique pilot approach to landing performance. Evaluations of pilot performance should be comprehensive, objective and standard. However, the evaluator's assessment of performance is limited to direct observations. It is possible for pilot actions that contribute to marginal or unsatisfactory performance to go unnoticed by an evaluator. Reporting of evaluation results in a meaningful format is also important.

Many Navy aircraft have advanced data recorders capable of storing accurate parametric data at high recording rates. Each type of approach to landing flown in a Navy aircraft has detailed procedures and related performance standards specifying how the approach should be flown. A typical approach evaluation assesses how well the pilot executes procedures, which can be correlated with reference to specific points or gates along the approach. Comparing an individual approach to these gates can be used to identify whether the individual approach matched the published procedure at the gates. This method only identifies if the individual approach matched the published procedure at each gate for the parameters in the procedures.

Every Navy aircraft type has a standard procedure for landing. Many fixed wing aircraft must be capable of landing aboard an aircraft carrier in bad weather, at night and in zero visibility. For example, the types of approach to landing for the F/A-18 Hornet are listed in Table 1. In addition to landing on aircraft carriers, many rotary wing aircraft must be capable of landing on the small landing decks of destroyers and amphibious assault ships. These approaches to landing demand a high level of performance from the aircraft and the pilot. Current training methods include instruction and grading according to the procedures and standards defined in the Naval Air Training and Operating Procedures Standardization (NATOPS) and other Standard Operating Procedures (SOPs). Navy pilots train and are graded continually on technique and execution of shipboard landing for a number of approach types in order to maintain their qualifications.

TABLE 1

Types of Approach to Landing

F/A-18 Hornet Fixed Wing Aircraft - On Shore Landing

1. Visual Flight Rules (VFR) Left-Hand Landing Pattern.
2. Visual Flight Rules (VFR) Right-Hand Landing Pattern.
3. Visual Flight Rules (VFR) Straight-In.
4. Field Carrier Landing Practice (FCLP), Left Hand Rules - Case I (Fair weather approach, downwind leg to 180° turn to final approach).
5. Field Carrier Landing Practice (FCLP), Straight-In, - Case III (Night or visibility below minimum due to weather).
6. Emergency Approach (Straight in, field arrest gear if available).
7. Single Engine Approach (Straight in).

F/A-18 Hornet Fixed Wing Aircraft - Ship Board Landing

1. Case I, downwind leg to 180° turn to final (fair weather approach).
2. Case II, straight in approach to 10 nm, proceed as Case I inside 10 nm (weather conditions such that flight may encounter instrument conditions).
3. Case III, straight in approach (poor weather and night approach).
4. Emergency Approach (Case III approach profile).
5. Single Engine Approach (Case III approach profile).

Trained personnel grade shipboard landings. A Landing Signal Officer (LSO) is an experienced aviator who observes aircraft carrier landings from the deck. The Landing Signal Officer (LSO) provides direction to the incoming pilot, and if necessary, waves off the landing, directing the pilot to abort the landing. The Landing Signal Officer (LSO) also assesses each approach to landing and grades the pilot on every approach flown. Similarly for helicopter landings aboard smaller vessels, a Landing Signal Enlisted (LSE) provides the same function to inbound helicopters.

Fixed wing aircraft pilots perform Field Carrier Landing Practice (FCLP) approaches on land to simulate landing on an aircraft carrier. These approaches are flown to imitate, as closely as possible, carrier landings and are a critical part of a Navy pilot's initial and in-service training. As on an aircraft carrier, a Landing Signal Officer (LSO) observes, directs and grades every approach to landing. During flight debriefing, pilots receive the Landing Signal Officer's (LSO) detailed assessment of each approach.

SUMMARY OF THE INVENTION

A method has been found for assessing the approach to landing of an identified aircraft on a landing surface. Parametric data of all aircraft approaches to landing on an identified landing surface are recorded and assembled to form a baseline data set. Parametric data of the identified aircraft approach to landing on the landing surface are recorded to form an identified aircraft approach to landing data set. Relevant parameters of interest are selected from the baseline data set to form a profile descriptive baseline data set. The profile descriptive baseline data set is statistically evaluated to form a descriptive baseline statistics data set. The identified aircraft approach to landing data set is compared with the descriptive baseline statistics data set to form a comparison. The comparison is an assessment of the approach to landing of the identified aircraft. The assessment is recorded and reported to the pilot of the aircraft.

The method is useful for evaluating pilot approach to landing performance under conditions where the typical successful performance varies from published procedures. The method is also useful to evaluate pilot performance outside the scope of human observation.

BRIEF DESCRIPTION OF THE DRAWING

FIG. 2 is an Intelligent Leading Indicator display.

FIG. 3 is an Intelligent Leading Indicator display showing the results from a Baseline Comparative Analysis.

FIG. 4 through FIG. 8 are graphs relating to FIG. 3. Each of FIG. 4 through FIG. 8 portrays an aircraft flight parameter as a function of altitude, for both the historical set of aircraft data shown as bands, and the aircraft of interest, shown as data points. FIG. 4 displays airspeed versus altitude. FIG. 5 displays ground speed versus altitude. FIG. 6 displays glide path angle versus altitude. FIG. 7 displays pitch attitude versus altitude. FIG. 8 displays rate of climb versus altitude. The two-dimensional historical data ranges in FIG. 4 through FIG. 8 correspond to the one-dimensional horizontal historical data ranges shown in FIG. 3.

FIG. 9 shows a different aircraft being evaluated relative to historical data from the same aircraft type. The performance data for the historical set of aircraft are identical in FIG. 3 and FIG. 9. That is, the one-dimensional horizontal historical data ranges shown in FIG. 9 are identical to the one-dimensional horizontal historical data ranges shown in FIG. 3. The difference between FIG. 3 and FIG. 9 is in the performance of the aircraft of interest in the various criteria. The landing performance of the aircraft in FIG. 9 is below average.

FIG. 10 shows airspeed versus altitude. FIG. 11 shows ground speed versus altitude. FIG. 12 shows glide path angle versus altitude. FIG. 13 shows pitch attitude versus altitude. FIG. 14 shows rate of climb versus altitude. The historical performance data for the aircraft in FIG. 4 through FIG. 8 are identical to the historical performance data for the aircraft data in FIG. 10 and FIG. 14, respectively. That is, the two-dimensional historical data ranges shown in FIG. 10 through FIG. 14 are identical to the two-dimensional historical data bands shown in FIG. 4 through FIG. 8, respectively.

DETAILED DESCRIPTION OF THE INVENTION

Baseline Comparative Analysis

Baseline Comparative Analysis (BCA) is a method of evaluating performance without predefined criteria. The method permits analysis of system behavior where limits are either unknown or far outside the normal operational range. By comparing a single event or set of events to a baseline data set, a relative assessment of performance can be made. A baseline data set describes typical system performance with a series of operating parameters. The baseline analysis operates on a large set of baseline data. It is important to note that the method of analysis of the invention operates on actual pilot performance data, not standards of performance. The envelopes describing highest data concentration are determined by establishing a mean or median and a standard of deviation or percentile banding of the baseline data set. While standards of deviation are routinely computed for a normal data distribution, they are not as accurate if the distribution is heavily one sided or otherwise biased. Since this is the case for many flight maneuvers and aircraft types, percentile banding is often a more descriptive method of data concentration envelope characterization.

Figure 1:
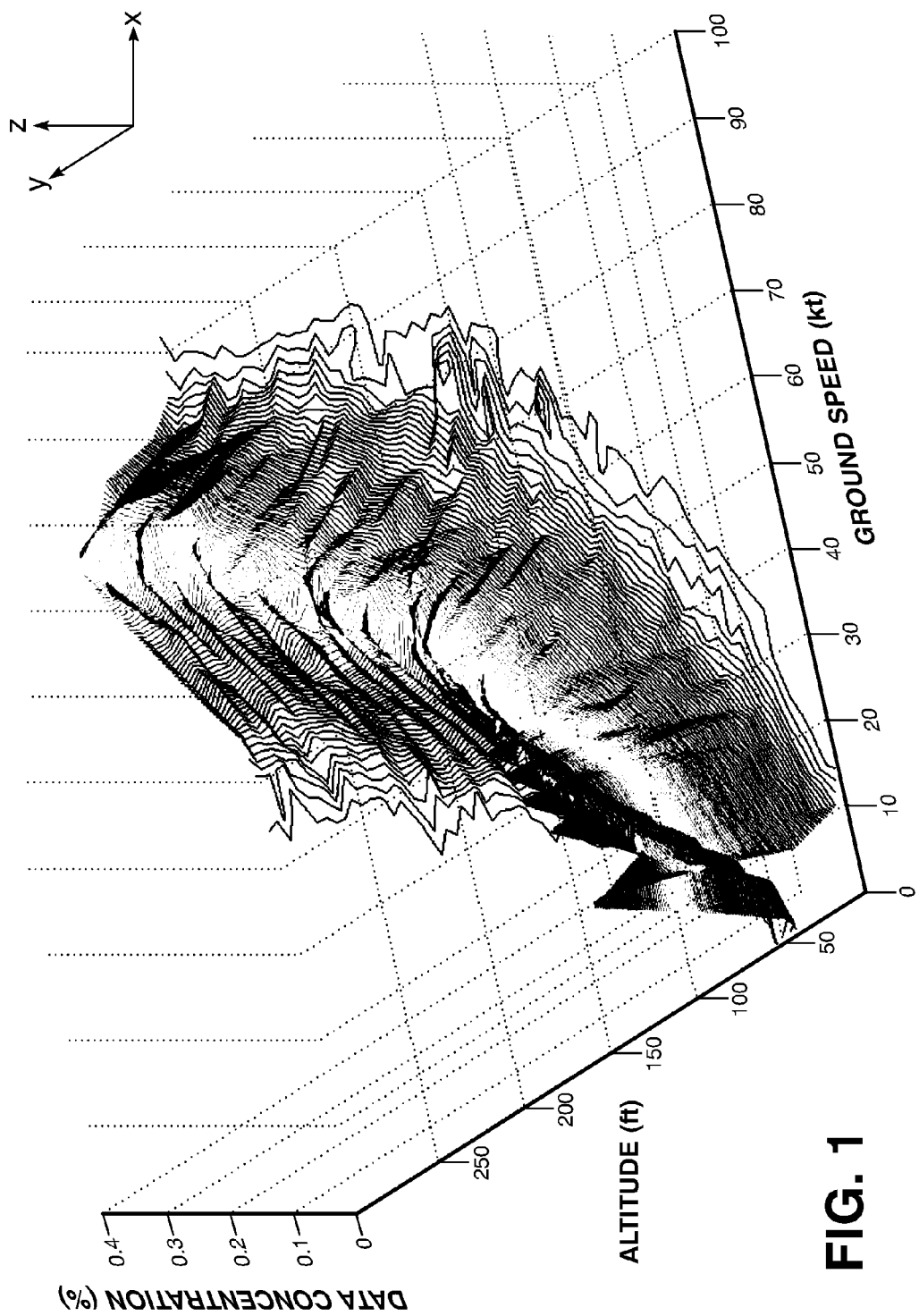
FIG. 1 is a graph of a distribution of altitude versus ground speed for a historical set of aircraft approaches to landing.
Figure 10:
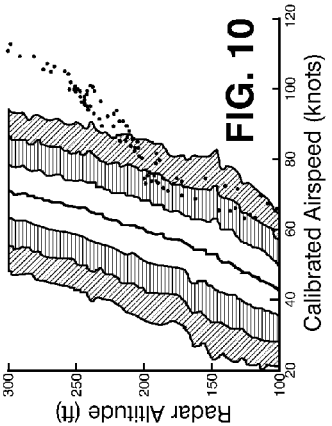
FIG. 10 through FIG. 14 are graphs relating to FIG. 9, similar to FIG. 4 through FIG. 8, respectively.
Figure 11:
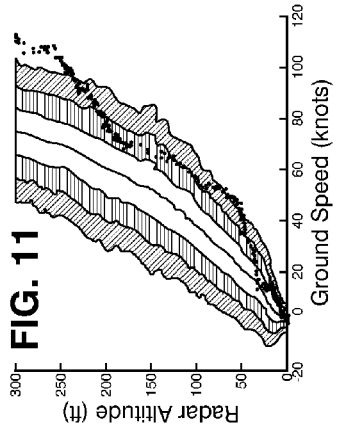
Figure 14:
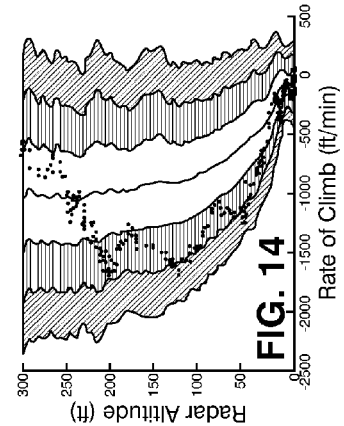

A baseline data set is shown in FIG. 1. More than 2,600 landings were recorded over the course of 2½ years in four helicopters with high data rate flight data recorders. Of the more than 2,600 approaches to landing, 943 were within allowable margins for the selected criteria and were used to form the baseline data set. Ground speed on the x-axis is plotted against altitude on the y-axis. Data concentration as a percent of the data set is plotted on the z-axis. The data concentration maxima or series of peaks on the z-axis are the median of the data set and would be expected to align with the performance standard defined by Standard Operating Procedures (SOPs). However, this may not be the case. Comparison of performance of a single maneuver with this baseline data set is used to measure performance relative to typical operation. This is not a measurement of performance in an absolute sense, but rather performance relative to that of the group of pilots who populated the baseline data set. It also must be noted that if the baseline data set is based on standard and accurately repeated performances, then the envelopes, i.e. statistical banding, will be narrow and small deviations from the median will appear significant in the baseline comparative analysis.

Once the baseline is assembled to form a baseline data set, it is used to assess an approach segment or a set of approach segments for an individual landing. The approach segments identified for evaluation are recorded in the same manner as the baseline data set, and then compared to the baseline data. If the event occurs in a manner consistent with the baseline peak, it will align with the middle of the baseline distribution. However, if the event differs, it will be spaced from the baseline peak and can be identified as an anomaly.

Baseline Data Statistical Evaluation

The mean is a single number that typifies the baseline data set at any point in the set of numbers, such as the arithmetic mean, the geometric mean or the expected value.

The median is a value of the baseline data which is so positioned in the set of numbers, arranged in numerical order, that there are an equal number of data points of greater magnitude and lesser magnitude.

The percentile is the value below which a certain percent of observations fall. The $25^{th}$ percentile is known as the first quartile, the $50^{th}$ percentile as the median or second quartile and the $75^{th}$ percentile as the third quartile. Percentile banding is a group of data falling within a percentile range.

The standard deviation is the positive square root of the expected value of the square of the difference between a random variable and its mean.

Windowing is the aggregation of parametric data (dependent variable data) over more than one increment of the independent variable. This is typically more than one recording increment. Window size is the range of the independent variable in the window. Data in the window can be averaged or otherwise statistically evaluated to represent all of the data in the window.

Baseline Comparative Analysis Display

Once the baseline mean or median is determined and a single maneuver is analyzed for comparison, the results are displayed. Presentations for a baseline comparative analysis have been developed. One presentation that has proven effective is the Intelligent Leading Indicator Display (ILIDS). The Intelligent Leading Indicator Display presents an entire baseline comparative analysis in a manner that provides a significant amount of information while remaining comprehensible at a glance. FIG. 2 shows an example of this display method. Each envelope of interest is represented by a horizontal bar (2-1, 2-2, 2-3, 2-4) and slider (S1, S2, S3, S4), where the bar displays the baseline distribution and the slider displays the assessed individual performance. The mean or median (M) is indicated on the bar and is logically centered. The green region (G) of the bar values are within one standard deviation of the mean or median (M). Yellow region (Y) indicates a data reading from one to two standard deviations from the mean. Red region (R) indicates values greater than two standard deviations from the mean or median (M). If the baseline presentation is in percentiles, a typical configuration is from 66% of the data to fall within the green region (G), 90% within the yellow region (Y), and 99% within the red region (R). ILIDS was designed to convey information without the need for explanation of the display. While the details of the data are not apparent from the brief display, ILIDS provides a clear general display of the analytical results. ILIDS is more fully described in U.S. patent application Ser. No. 12/006,753 filed Dec. 20, 2007, for Intelligent Leading Indicator Display to Eric J. Silberg et al., incorporated herein by reference.

In many cases, an ILIDS display provides all the information needed to make an assessment, particularly if the performance is within one or two standard deviations. If more information is needed, it can be useful to display time history or parametric plots overlaid on the baseline data set. This graphical representation of performance relative to the baseline is highly effective for assessing a single parameter, but often does not provide a comprehensive overview of the event and is therefore generally used as a supplement to the ILIDS display. Although ILIDS displays have been successful for conveying the results of many different baseline comparative analyses, complex, multi-faceted maneuvers such as an approach to landing may not be adequately represented by these displays alone.

Baseline Comparative Analysis Applications

Baseline comparative analysis is used to statistically assess aircraft approaches to landing relative to a mean or median. The baseline comparative analysis can alert an evaluator to the presence of anomalous behavior. However, it cannot provide a cause of the anomaly or propose a solution.

Advanced Landing Analysis

The design an approach to landing analysis method requires an understanding of the procedures and operations of the aircraft followed by extracting and reporting the relevant information. The use of both published procedures and the experience of pilots to design the analysis were combined to produce an overall picture of the landing. Published procedures for a landing typically divide the approach into phases identified by gates. Gates are sets of a limited number of parameters describing the state of the aircraft at points along the approach to produce an ideal landing. Phases and gates are a starting point for designing a more comprehensive system of analysis. Gates only specify the state of the aircraft at discrete points in the approach to landing. Also, gates do not fully describe the parameters that influence landing performance.

Baseline Creation and Execution of Analysis

The steps in setting up and executing a landing analysis for aircraft are as follows. First, a baseline data set is assembled. The baseline must be representative of typical approach to landing performance. Extreme or irrational outliers should be taken out, but non-standard landings not in compliance with prescribed procedures should remain in the set. It is these non-standard landings that contribute to typical performance of the maneuver and are effectively analyzed by the method of the invention.

Once the baseline set is assembled, it is assessed. The parameters of interest are associated with an independent value or values relevant to the landing. The independent value can be time to landing, distance to landing, altitude, or other parameters representative of the landing type and aircraft. This provides common references for analysis and allows the creation of large data arrays. Each parameter can then be statistically evaluated. It is preferable to use a moving average or windowing method while assessing the baseline or individual landing performance. This helps to minimize the effect of parametric unsteadiness, a common issue with flight data.

The distribution of the data will determine the analysis method, and each parameter may require its own method. Some parameters will be highly skewed or entirely one-sided where there is a physical limit. Other parameters may be normally distributed. Mean and standard deviation are preferred methods for comparative analysis and are well known. Mean and standard deviation can be calculated quickly. However, not all distributions can be expressed in this manner. In cases, such as for highly skewed or one-sided distributions, the data set can be assessed via percentiles. Once the analytical method is established for the baseline data set, the individual landings of interest are analyzed. Parameters from an individual landing of interest are quantified in the same manner as those of the baseline data and then compared to baseline data distributions.

An effective display method should be used for reporting results. The phases and gates specified in the published landing procedures are a good starting point for separating the landing into constituent parts for display of the results. As an example, each parameter/gate combination can be given a bar in an ILIDS display. Pilots usually prefer a simple report which can be understood quickly. More detail is often desirable for student pilots and can be included in supplemental displays. Once the display has been developed, individual landings can be analyzed.

An automated landing analysis requires that the landing be identified in the flight data. Although a landing is visually apparent, the detection of an actual landing in flight data can be difficult depending on the data available. Care must be taken to establish the time of landing, location, and other identifying parameters in order for the comparative analysis to yield consistent and accurate results. Also, the type of landing must be established in order to execute the correct analysis type. Once the landing type is determined and the landing data are extracted, the data is analyzed. As mentioned, the data are treated in a manner identical to that of the baseline and then quantified with respect to the baseline distribution. This will yield performance relative to the baseline. This is the assessment of the maneuver presented to the pilot and other interested persons.

Data Recording

High quality flight data is crucial to a successful landing analysis. There are a number of considerations in evaluating suitability of a data source. Lower data rates may be suitable for some purposes. Higher data rates are desirable to capture the most dynamic movement. A data rate of about 1 Hz (cycles per second) is sufficient for assessment of vehicle motion. Higher rates of 10 Hz or greater are typically needed to capture pilot input manipulations and responsive movement of control surfaces. In an analysis of pilot manual input to stick position during approach, it has been found that dynamic content is not captured at a 1 Hz rate. A rate of 10 Hz captures those inputs. That is, a data collection rate of 1 Hz was too slow to evaluate pilot manual inputs to controls. A data collection rate of about 10 Hz captured pilot inputs to the control stick, permitting determination of pilot control input efficiency. Control input efficiency is the amount of pilot manual control input to achieve the desired or correct aircraft response.

Accuracy and precision of recorded data are also important. An example of this can be found in related altitude parameters. Altitude data may be inaccurate, particularly near the ground. Military aircraft typically use both barometric altitude and radar altitude measurements. Barometric altimeters can be affected by unstable airflow, flow separation, and other aerodynamic phenomena which are prevalent at low speeds and near the ground. Radar altimeters are generally accurate near the ground as the aircraft is generally stable and level, but the recording of this parameter is coarse in some data sets. Low precision provides few distinct values near the ground and results in stepped output for the radar altitude parameter. One must be aware of both accuracy and precision in analyzing the data.

The specific parameters need for a landing analysis depends on the aircraft. Useful results can ordinarily be derived from a few parameters. Altitude and either time or aircraft position are always required. Other parameters that are used frequently are air speed, ground speed, pitch attitude, roll attitude, and vertical velocity. In addition, pilot flight control and power inputs, accelerations, control surface positions, and aircraft state parameters, e.g. weight on wheels, are useful to optimize results. The quantity and quality of analysis depends on the data recorded. Fewer high rate, high precision parameters are more effective for evaluating a landing than many lower quality parameters, even if the parameters are equally accurate. A constant, fixed data collection rate during the period of interest is desirable, though variable rate recording can be utilized efficiently.

Application of Advanced Landing Analysis Techniques

The inventive method was applied for assessment of approaches to landing of the SH-60 Seahawk helicopter. The SH-60 Seahawk helicopter is a medium sized utility and tactical helicopter designed for operations aboard aircraft carriers and smaller ships. It can operate in all weather conditions and provides defensive, search and rescue transport, and light cargo capabilities. Landing approaches for a SH-60 helicopter differ greatly depending on the type of operation and location. Approach to a shore landing site versus a ship landing pad presents different requirements to the pilot and the aircraft.

A standard shore hover to landing approach was chosen for this analysis. The SH-60 Naval Air Training and Operating Procedures Standardization (NATOPS) manual describes the procedure for a standard hover to landing type landing and identifies phases and gates that describe the approach profile. Types of approach are listed in Table 2. Phases and gates are listed in Table 3.

TABLE 2

Types of Approach to Landing

SH-60 Seahawk Helicopter - On Shore Landing

1. Normal Approach to No-Hover Landing
2. Normal Approach to Hover Landing
3. Steep Approach to No-Hover Landing
4. Steep Approach to Hover Landing
5. Shallow Approach to Running Landing SH-60 Seahawk Helicopter - Ship Board Landing TABLE 2-continued Types of Approach to Landing 1. Visual Glide Path Normal Approach Profile.
2. Visual Glide Path Alternate Approach Profile.
3. Standard Instrument Approach to Minimums Normal Approach Profile.
4. Standard Instrument Approach to Minimums Alternate Approach Profile.
5. Emergency Approach.
6. Offset Approach.

TABLE 3

SH-60 Seahawk Helicopter Landing Segments

| Altitude Phase Above Ground Level(AGL) | Parameter of Interest at the corresponding Gate |
| --- | --- |
| 300 to 250 feet AGL | Air Speed |
| | Glide Path Angle |
| 200 to 150 feet AGL | Air Speed |
| | Glide Path Angle |
| 35 to 25 feet AGL | Ground Speed |
| | Pitch Attitude |
| 15 to 5 feet AGL | Ground Speed |
| | Drift Speed |
| | Pitch Attitude |
| 5 feet AGL | Rate of Descent |
| | Drift Speed |

The parameters of interest based on these phases are air speed, glide path angle, ground speed, pitch attitude, drift speed, and rate of descent. All parameters are associated with an independent value of altitude above ground level (AGL). The baseline for the SH-60 helicopter normal landing analysis was established using data from 943 landings recorded on more than 2,600 flights over a 2½ year period. Analysis of the data showed that the parameters had a relatively normal distribution, so a mean and standard deviation method was selected for baseline data characterization and presentation of results.

The six parameters of interest were selected from the baseline to form the profile descriptive baseline data set. A windowing method was used to assess the data set. Windows of five-foot altitude increments were generated. For each parameter in the profile descriptive baseline data set, the mean and standard deviation for all data in each window was calculated. The result forms the descriptive baseline statistics data set.

Once a single landing of interest is identified, parametric data from the identified approach to landing is windowed and the statistics are calculated using the same method used for generation of the descriptive baseline statistics data set. This forms the single approach to landing data set. For each of the six parameters in the single approach to landing data set, the individual landing data are compared to the descriptive baseline statistics to form an assessment of the approach to landing of interest.

An ILIDS display supplemented by parametric plots proved to be an effective method of conveying overall performance while still allowing easy access to more detailed information. From the phases and gates identified by published procedures, eleven criteria were chosen for presentation in the ILIDS portion of the report.

TABLE 4

Criteria for Normal Approaches to an Airfield 1. air speed at 300-250 feet above ground level.
2. glide path angle at 300-250 feet above ground level.
3. airspeed at 200-150 feet above ground level.
4. glide path angle at 200-150 feet above ground level.
5. ground speed at 35-25 feet above ground level.
6. pitch attitude at 35-25 feed above ground level.
7. ground speed at 15-5 feet above ground level.
8. drift speed at 15-5 feet above ground level.
9. pitch attitude at 15-5 feet above ground level.
10. rate of descent at 5 feet above ground level.
11. drift speed at 5 feet above ground level.

For each of the criteria identified in Table 2, the comparisons to the descriptive baseline statistics for the given parameter and altitude phase are aggregated to form a result. This result is presented to the pilot as a slider on the corresponding horizontal bar of the ILIDS display.

FIG. 3 shows an ILIDS display supplemented by parametric plots in FIG. 4 through FIG. 8. FIG. 4 through FIG. 8 report results of a comparison of an individual approach to landing to the baseline data set, that is, the statistically derived norm for the total of all similar approaches.

The ILIDS in FIG. 3 presents eleven horizontal bars corresponding to the eleven criteria identified. Each criterion is shown as a graphical bar representing a range of values. Each bar corresponds to its own individual criterion and is broken down into data distribution bands according to the distribution of the corresponding baseline data set.

In each horizontal bar in FIG. 3, the full range of values is centered on the mean or median (M) performance of the historical approach to landing data. The color green (G) indicates values within one standard deviation of the mean. The color yellow (Y) indicates values from one to two standard deviations from the mean. The color red (R) indicates values greater than two standard deviations from the mean. The values of criteria from the individual approach to landing being compared to the baseline data set are shown as event sliders (S).

Each multi-banded horizontal bar has an associated slider (S). The slider indicates the criterion value for a single landing. Where this slider falls on each baseline criterion-related bar indicates how that landing compared to the baseline. When the slider is in the green region (G) of the bar, the performance with respect to that criterion is assessed as acceptable. When the slider is in the red region (R) of the bar, the performance with respect to that criterion is assessed as poor.

In order to make the ILIDS display more meaningful the baseline data mean and the appropriate scale for each group of parameters is presented horizontally with the ILIDS bars. Without this information, all the bars could look identical and only a relative sense of performance could be determined. With this presentation, a pilot can see both how the analyzed landing compares to the baseline as well as to published standards.

The individual criterion plots shown in FIG. 4 through FIG. 8 provide the data used to form the assessment shown in FIG. 3. Each of FIG. 4 through FIG. 8 is a plot of air speed, ground speed, pitch attitude, glide path angle, and rate of climb throughout the approach to landing. FIG. 4 through FIG. 8 give additional information about the specific performance of an individual approach to landing in comparison with corresponding baseline data. As shown in FIG. 4 through FIG. 8, each plotted point represents one data point during the approach to landing. Each of the bands shown in FIG. 4 through FIG. 8 is identical to the corresponding criterion-related band shown in FIG. 3 characterizing by the same statistical range.

FIG. 3 displays average landing performance, in which case a pilot might look at the ILIDS summary and decide no further information was needed. FIG. 3 demonstrates that all the criteria for the approach to landing of interest are in the green band (G), i.e., within one standard deviation of the baseline data mean. Falling within the green region (G) of every bar indicates an acceptable performance. An occasional excursion into the yellow region (Y) would probably not significantly degrade the criteria score.

FIG. 9 through FIG. 14 show a non-standard landing. The ILIDS display shows that something was out of the ordinary during the landing. The parametric plots give a better description of what actually happened.

Figure 9:
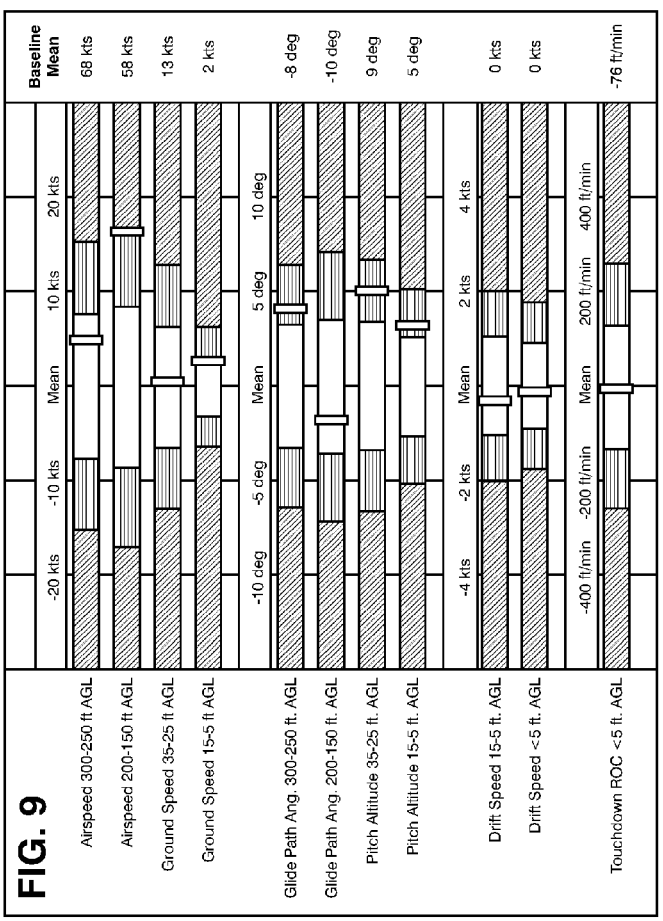
FIG. 9 is a graph similar to the graph shown in FIG. 3.
Figure 13:
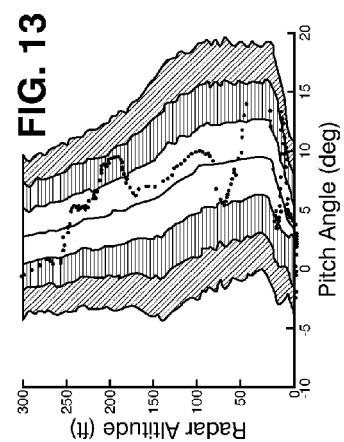
Figure 12:
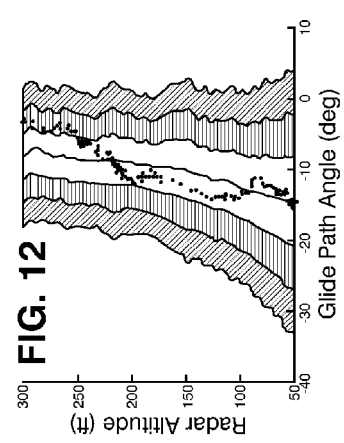

FIG. 9 shows a below average rated approach to landing. FIG. 10 through FIG. 14 correspond with FIG. 9 the same as FIG. 4 through FIG. 8 correspond with FIG. 3. The outlying data points in FIG. 9 are a leading indicator of an underperforming pilot. FIG. 9 shows the individual performance, indicated by slider S, as falling in the yellow band (Y) and red band (R) for several criteria. These outliers are clear indication of a below average or non-standard landing.

The method is used for evaluating pilot approach to landing performance in sea and weather environments in which a large group of pilots' successful landings noticeably departs from the gates defining ideal performance. The method is also used to evaluate pilot performance for safety and effectiveness under conditions which make evaluation relative to gates less meaningful.

The method is used for evaluating pilot approach to landing performance by comparing the performance of a single approach to landing against typical successful performance of the maneuver. The method is also used to quantify the magnitude of deviations in pilot performance from a typical successful performance of the maneuver. The method is also used for evaluating pilot approach to landing performance under conditions where the published procedures do not fully describe the approach to landing profile. The method is also used for evaluating pilot approach to landing performance under conditions where the typical successful performance varies from the published procedures. The method is also used to evaluate pilot performance for conditions that are outside the scope of human observations.

The foregoing discussion discloses and describes embodiments of the invention by way of example. One skilled in the art will readily recognize from this discussion, that various changes, modifications and variations can be made therein without departing from the spirit and scope of the invention as defined in the following claims.

What is claimed is:

1. A method of assessing an identified aircraft approach to landing, including the steps of:
   a. recording a multiplicity of parametric data of aircraft approaches to landing on an identified landing surface and assembling the parametric data to form a baseline data set,
   b. recording parametric data of the identified aircraft approach to landing on the identified landing surface to form an identified aircraft approach to landing data set,
   c. selecting relevant parameters of interest from the baseline data set to form a profile descriptive baseline data set and statistically evaluating the profile descriptive baseline data set to form a descriptive baseline statistics data set, d. comparing the identified aircraft approach to landing data set to the descriptive baseline statistics data set, forming a comparison therefrom, and recording the comparison, thereby assessing the identified aircraft approach to landing on the identified landing surface.

2. The method of claim 1 wherein the landing surface is aboard ship.

3. The method of claim 1 additionally comprising:
reporting the identified aircraft approach to landing data set in combination with percentile banding of the descriptive baseline statistics data set.

4. The method of claim 1 wherein the recording parametric data is at a fixed rate through the approach to landing.

5. The method of claim 1 wherein the recording parametric data is at a variable rate through the approach to landing.

6. The method of claim 1 wherein the criteria for selecting relevant parameters of interest include aircraft type and type of approach.

7. The method of claim 1 wherein the criteria for selecting relevant parameters of interest from the baseline data set include aircraft type, weather conditions, available sunlight and heading of approach to landing.

8. The method of claim 1 wherein statistically evaluating the profile descriptive baseline data set includes calculating standard deviation of data in the data set to form the descriptive baseline statistics data set.

9. The method of claim 1 wherein statistically evaluating the profile descriptive baseline data set includes calculating percentile distribution deviation of data in the data set from a median.

10. The method of claim 1 wherein statistically evaluating the profile descriptive baseline data set includes calculating standard deviation of data in the data set and comparing includes reporting the comparison in standard deviations.

11. The method of claim 1 wherein statistically evaluating the profile descriptive baseline data set includes windowing parametric data.

12. The method of claim 1 additionally comprising:
adding the identified aircraft approach to landing data set to the baseline data set.

13. The method of claim 1 additionally comprising:
reporting the comparison as the identified aircraft approach to landing data set together with the descriptive baseline statistics data set.

14. The method of claim 1 additionally comprising:
displaying the comparison graphically in a bar and slider format.

15. A method of assessing pilot performance in an approach to landing on a shipboard landing surface, including the steps of:
a. recording a multiplicity of parametric data of aircraft approaches to landing on an identified shipboard landing surface and assembling the parametric data to form a baseline data set,
b. recording parametric data of the a specified pilot's aircraft approach to landing on the identified shipboard landing surface to form a specified pilot's aircraft approach to landing data set,
c. selecting relevant parameters of interest from the baseline data set, forming a profile descriptive baseline data set therefrom and statistically evaluating the profile descriptive baseline data set to form a descriptive baseline statistics data set,
d. comparing the specified pilot's aircraft approach to landing data set with the descriptive baseline statistics data set and forming a comparison therefrom,
recording pilot control manipulations,
f. recording aircraft response to those pilot control manipulations,
g. determining an efficiency of pilot control manipulations, and displaying the efficiency of pilot control manipulations, thereby assessing the specified pilot's aircraft approach to landing on the identified shipboard landing surface.

16. The method of claim 15 wherein recording pilot, control manipulations is at a recording rate of about 1 Hz to about 10 Hz.

17. The method of claim 15 additionally comprising:
reporting the comparison as the identified aircraft approach to landing data set together with the descriptive baseline statistics data set.

18. The method of claim 15 additionally comprising:
displaying the comparison graphically in a bar and slider format.

* * * * *